(12) United States Patent
Mueller et al.

(10) Patent No.: US 9,103,268 B2
(45) Date of Patent: Aug. 11, 2015

(54) INTAKE PIPE FOR A COMBUSTION ENGINE

(75) Inventors: Rolf Mueller, Steinheim (DE);
Eberhard Pantow, Winnenden (DE);
Michael Spieth, Gomaringen (DE)

(73) Assignee: MAHLE Behr GmbH & Co. KG, Stuttgart (DE)

( * ) Notice: Subject to any disclaimer, the term of this patent is extended or adjusted under 35 U.S.C. 154(b) by 906 days.

(21) Appl. No.: 12/675,446

(22) PCT Filed: Aug. 20, 2008

(86) PCT No.: PCT/EP2008/006845
§ 371 (c)(1),
(2), (4) Date: Jul. 5, 2010

(87) PCT Pub. No.: WO2009/027043
PCT Pub. Date: Mar. 5, 2009

(65) Prior Publication Data
US 2010/0263637 A1    Oct. 21, 2010

(30) Foreign Application Priority Data
Aug. 27, 2007 (DE) .......................... 10 2007 040 661

(51) Int. Cl.
*F02G 5/00* (2006.01)
*F02B 29/04* (2006.01)
(Continued)

(52) U.S. Cl.
CPC ......... *F02B 29/0418* (2013.01); *F02B 27/0221* (2013.01); *F02B 27/0278* (2013.01); *F02B 29/0475* (2013.01); *F02B 31/06* (2013.01); *F02M 35/108* (2013.01); *F02M 35/10072* (2013.01); *F02M 35/10222* (2013.01);
(Continued)

(58) Field of Classification Search
CPC .......... F02G 5/00; F02M 31/02; F02M 31/00; F02M 25/07; F01L 9/02

USPC .......................................................... 123/556
See application file for complete search history.

(56) References Cited

U.S. PATENT DOCUMENTS 4,135,481 A * 1/1979 Resler, Jr. ...................... 123/430
4,445,480 A * 5/1984 Inoue et al. .................... 123/432
(Continued)

FOREIGN PATENT DOCUMENTS

DE  665315  9/1938
DE  3815991  7/1989
(Continued)

OTHER PUBLICATIONS

European Office Action for Application 08 801 629.0 dated Sep. 5, 2011.

*Primary Examiner* — Hung Q Nguyen
*Assistant Examiner* — James Kim
(74) *Attorney, Agent, or Firm* — Bachman & LaPointe, PC

(57) ABSTRACT

Disclosed is an intake pipe for a combustion engine, comprising a housing (1) with a supply duct (2) for especially compressed air, a heat exchanger (8) which is disposed within a main duct (4) in the housing (1) and through which the air can flow in order to exchange heat with a fluid, and a bypass duct (5) that is separated from the main duct (4) in at least some sections and is fitted with at least one positioning element (7) to allow the fed air to adjustably bypass the heat exchanger (8). An end of the bypass duct (5) on the engine side is placed at a still flow-relevant short distance from an opening (11) of an intake valve (10) of the combustion engine.

35 Claims, 11 Drawing Sheets

(51) Int. Cl.
*F02B 31/06* (2006.01)
*F02M 35/10* (2006.01)
*F02M 35/108* (2006.01)
*F02B 27/02* (2006.01)
*F02M 25/07* (2006.01)
*F02M 31/02* (2006.01)
*F01L 9/02* (2006.01)
*F02M 31/00* (2006.01)

(52) U.S. Cl.
CPC ... *F02M35/10268* (2013.01); *F02M 35/10321* (2013.01); *F01L 9/02* (2013.01); *F02B 29/0437* (2013.01); *F02B 2275/48* (2013.01); *F02G 5/00* (2013.01); *F02M 25/07* (2013.01); *F02M 31/00* (2013.01); *F02M 31/02* (2013.01); *Y02T 10/125* (2013.01); *Y02T 10/14* (2013.01); *Y02T 10/146* (2013.01)

(56) References Cited

U.S. PATENT DOCUMENTS

| | | | | |
|---|---|---|---|---|
| 4,481,922 | A * | 11/1984 | Sugiura | 123/306 |
| 4,643,136 | A * | 2/1987 | Ura et al. | 123/184.42 |
| 5,269,143 | A * | 12/1993 | Cikanek et al. | 60/599 |
| 5,273,010 | A * | 12/1993 | Elder | 123/184.21 |
| 5,367,990 | A * | 11/1994 | Schechter | 123/543 |
| 5,404,844 | A * | 4/1995 | Schechter | 123/90.12 |
| 5,533,483 | A * | 7/1996 | Gau et al. | 123/308 |
| 6,626,422 | B2 * | 9/2003 | Kaiser | 251/305 |
| 6,901,942 | B2 * | 6/2005 | Krimmer et al. | 137/15.25 |
| 7,100,584 | B1 * | 9/2006 | Bruestle et al. | 123/563 |
| 2004/0072409 | A1 * | 4/2004 | Fitzgerald et al. | 438/455 |
| 2004/0231638 | A1 * | 11/2004 | Tominaga et al. | 123/308 |
| 2005/0072409 | A1 * | 4/2005 | Huebler | 123/568.18 |
| 2005/0139190 | A1 * | 6/2005 | Yu | 123/279 |
| 2007/0017489 | A1 * | 1/2007 | Kuroki et al. | 123/568.12 |
| 2007/0186536 | A1 * | 8/2007 | Hashizume | 60/278 |
| 2007/0261683 | A1 * | 11/2007 | Weiss et al. | 123/568.17 |

FOREIGN PATENT DOCUMENTS

| | | |
|---|---|---|
| DE | 10239110 | 3/2004 |
| DE | 10254016 | 6/2004 |
| DE | 10314236 | 11/2004 |
| DE | 102004047975 | 4/2006 |
| DE | 102006025889 | 12/2007 |
| EP | 1496221 | 1/2005 |
| EP | 1983171 A1 | 10/2008 |
| JP | 62247122 | 10/1987 |
| WO | 0136795 | 5/2001 |
| WO | 0240853 | 5/2002 |
| WO | 2008061694 | 5/2008 |

* cited by examiner

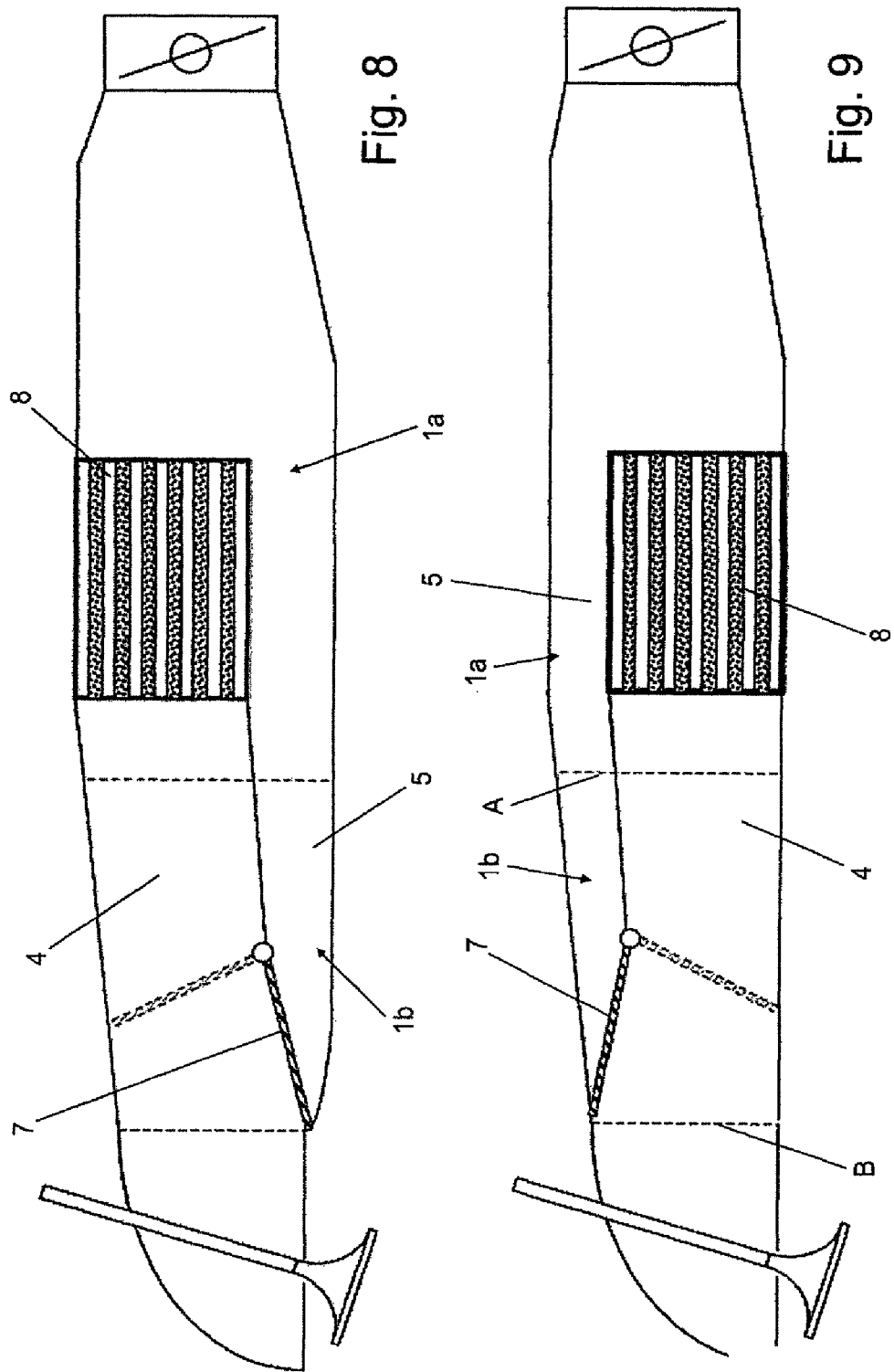

INTAKE PIPE FOR A COMBUSTION ENGINE

BACKGROUND OF THE INVENTION

The present invention relates to an intake pipe for a combustion engine.

DE 102 54 016 A1 describes a device for cooling charge air for a combustion engine, in which, according to one illustrative embodiment, an indirect charge air cooler is embodied as a subassembly with an intake pipe of a combustion engine, and the charge air cooler is furthermore surrounded via a bypass duct and the bypass mode can be selected by means of a control flap arranged upstream of the bypass. A throttle valve is arranged downstream of the charge air cooler and the bypass duct.

SUMMARY OF THE INVENTION

It is the object of the invention to specify an intake pipe for a combustion engine by means of which improved combustion is made possible, especially in the low engine speed range.

According to the invention, this object is achieved for an intake pipe mentioned at the outset by means of the disclosed features below. Arranging the end of the bypass duct at a distance sufficiently close to the valve opening of the inlet valve to be relevant to the flow enables the flow to the valve opening to be configured differently depending on whether the air is being fed in through the bypass duct or through the main duct or proportionally through both ducts. By means of this duct-dependent difference in the approach flow to the inlet valve, a corresponding difference in the swirl of the gas flowing into the cylinder is achieved, allowing optimization as a function of the operating state of the engine. The term "relevance to the flow" in the sense in which it is employed in the invention is taken to mean that the distribution of the flow density and/or direction of the flow varies across the valve opening for the same overall flow, depending on whether flow is through the main duct or the bypass duct.

It is particularly preferred if the clearance of the engine-side end of the bypass duct is no more than about seven times, with particular advantage no more than about four times, a diameter of the inlet valve, in order to ensure that the gas flows are influenced to a sufficient degree by the choice of the bypass duct or the main duct.

In a generally preferred embodiment, the bypass duct is designed as a tumble or swirl duct of the intake pipe. The prior art includes dividing inlet ducts of combustion engines into a plurality of component ducts and controlling them in an appropriate manner by means of a control flap, a component duct configured as a tumble or swirl duct giving a controlled swirl to the gas as it enters the combustion chamber, this generally being achieved by means of a one-sided approach flow to the inlet valve. Particularly with regard to the construction of a tumble or swirl duct, provision is preferably made here for the bypass duct to end immediately ahead of a curved wall surface of an inlet duct of the combustion engine. Such a curved wall surface, which can bring about a deflection of the gas through about 90°, for example, imparts an additional swirl to the gas flow.

To allow simple adaptation of an intake pipe according to the invention to conventional geometries of inlet ducts of cylinder heads, the bypass duct is preferably arranged above the main duct in relation to an opening plane of the inlet valve. As an alternative, however, it is also possible to provide for the bypass duct to be arranged below the main duct in relation to an opening plane of the inlet valve.

In an advantageous embodiment, suitable influencing of the gas flow can be achieved if a masking structure is provided for swirl generation in the end region of the bypass duct. Such a masking structure can be configured as a separation edge for the gas flow, for example.

In the interests of a sufficiently small pressure drop, even at low engine speeds, a flow cross section of the bypass duct is no less than about 10% of a flow cross section of the main duct.

To reduce the overall size of the intake pipe, the flow cross section of the bypass duct can be designed in such a way that it is no more than about 60% of a flow cross section of the main duct. This takes into account the effect that the heat exchanger arranged in the main duct generates a flow resistance, and the bypass duct can therefore have a smaller cross section for the same flow resistance.

In one embodiment of the invention, the main duct can be separated from the bypass duct by means of a dividing wall arranged in the housing, this being a simple means of separating the ducts. As an alternative, however, it is also possible for the bypass duct to be designed as a separate pipe conduit from the main duct, at least sectionwise. A solution of this kind may be preferred to allow individual adaptation to the installation space available or in order to form a particularly long bypass duct in order to take account of resonance criteria in conveying the gas, for example.

In an advantageous detail design, the bypass duct is designed, particularly as regards its length, as an oscillation tube for the generation of resonance-type pressure charging, especially in an engine speed range between about 1000 and about 3000 revolutions per minute. Given such a design, a good supply of gas to the engine via the bypass duct is ensured, especially in a low engine speed range, in which an exhaust turbocharger is not very effective. At higher engine speeds, at which an exhaust turbocharger compresses the supplied air in an effective manner, a switch is then preferably made to the main duct, by means of which cooling of the hot compressed air takes place by way of the integrated heat exchanger.

For reasons of cost and for reasons of weight saving, the housing is preferably constructed substantially from a plastic, a glass-reinforced polyamide being particularly suitable. A housing of this kind can comprise a number of parts, e.g. two housing halves which are friction welded to one another. As an alternative, however, it is also possible for the housing to be composed of a metal, e.g. aluminum.

In a suitable embodiment, the control element is arranged ahead of the heat exchanger in the direction of flow of the air. As an alternative, however, it is also possible for it to be arranged after the heat exchanger. In the latter case, the control element can be arranged in a region of the intake pipe which is separated in relation to different cylinders. Owing to the increased number of components and control flaps, an increased mechanical outlay is required as a result, but this is reduced as regards the driving forces since a lower actuating force is required overall owing to the small individual cross sections of the ducts. Fundamentally, it is desirable to provide as small as possible a volume between the inlet valve and the control element in order to ensure a particularly rapid response in combustion to a change by the control element.

To simplify the arrangement, provision can be made for it to be essentially only the bypass duct that can be closed by means of the control element. Owing to the flow resistance of the heat exchanger in the main duct, opening the control element that closes the bypass duct leads to the majority of the flow passing through the bypass duct owing to its low flow resistance.

It is advantageous in general if the control element is adjustable in multiple stages or in an infinitely variable manner for the variably adjustable distribution of the air flow between the main duct and the bypass duct.

In one advantageous embodiment, the air flows through both the main duct and at least a part of the bypass duct which is arranged downstream of the heat exchanger in one operating mode. This reduces the required installation space, at least downstream of the heat exchanger and especially in a region of separate inlet ducts, since all of the ducts can be used for feeding in air in full load operation, for example.

A further control element can preferably be provided, it being possible for the main duct to be closed by means of the control element and for the bypass duct to be closed by means of the further control element. In such an arrangement, there is an increased mechanical outlay but it may then be possible to dispense completely with an additional throttle valve since not only distribution of the air but also adjustment of the overall air flow rate is made possible.

In a simple and advantageous detail design, the control element is formed as a double flap, in particular a double flap provided with reinforcing ribs. Such a configuration is particularly robust mechanically. In a particularly advantageous embodiment, a control element of this kind forms the end of the bypass duct directly.

It is advantageous in general if a throttle valve is arranged in the intake pipe, in particular upstream of the control element, to control the overall gas flow.

The heat exchanger is preferably connected to a low-temperature cooling circuit. A low-temperature cooling circuit of this kind often comprises its own heat exchanger in the front area of the vehicle, in which case the achievable coolant temperature corresponds to the outside temperature. It is also possible for the low-temperature cooling circuit to be connected to a main cooling circuit of the combustion engine by way of control valves, thus allowing the air to be heated by way of the heat exchanger if required, e.g. in the case of a cold start. In a preferred alternative or complementary embodiment, the heat exchanger can be designed as an evaporator of a refrigeration circuit and, in particular, the refrigeration circuit forms part of an air conditioning system of the motor vehicle. Fundamentally, it is thereby possible to achieve particularly effective cooling, and it is even possible for achievable temperatures to be below the outside temperature. Thermal connection of the low-temperature cooling circuit to the refrigeration circuit can also be accomplished via an additional heat exchanger outside the intake pipe.

It is advantageous in general, for the purpose of varying the cooling capacity of the heat exchanger, to make a flow of the fluid through the heat exchanger controllable in an adjustable manner. In general, the fluid is a liquid coolant similar or identical in composition to a coolant in a main cooling circuit of the combustion engine, for example.

In a preferred embodiment, the control element is connected to an actuator to allow selectable adjustment. The actuator can comprise a pressure cell, the pressure cell being actuated by way of a pressure difference between an external pressure and the applied charge pressure, e.g. that of an exhaust turbocharger. This is a simple way of allowing the control element to be actuated in a manner dependent on the action of the exhaust turbocharger, with the result that the air flows to the combustion engine via the bypass duct at low engine speeds, when the action of the exhaust turbocharger is weak or absent, and the control element is set to the main duct for the purpose of cooling the air flow at higher engine speeds, at which the exhaust turbocharger brings about a significant pressure increase. As an alternative or complementary measure, the actuator can also have an electric drive and the control element can be controlled by way of a stored characteristic map, for example.

To improve operational reliability, at least one sensor for monitoring the position of the control element can be provided.

In a further embodiment of the invention, a feed for recirculated exhaust gas is furthermore arranged on the intake pipe. Exhaust gas recirculation systems are generally used to reduce pollutants, especially nitrogen oxides, and are employed both on diesel engines and on spark-ignition engines. In an advantageous detail design, the feeding of the recirculated exhaust gas takes place separately into the bypass duct and/or the main duct in order to allow particularly flexible metering of the recirculated exhaust gas according to the operating state. As an alternative, however, it is also possible for the exhaust gas simply to be fed into the bypass duct and the main duct simultaneously.

In a first variant of an exhaust gas recirculation system, the feed takes place downstream of the heat exchanger, with the result that the exhaust gas is not cooled by the heat exchanger of the intake pipe. In such a variant, the usual practice is for cooling of the recirculated exhaust gas to be accomplished by means of a separate exhaust gas cooler. As an alternative, however, it is also possible to provide for the recirculated exhaust gas to be fed in upstream of the heat exchanger, with the result that the heat exchanger provides additional or exclusive cooling of the recirculated exhaust gas, at least in certain operating modes.

In a further advantageous embodiment, a division between the bypass duct and the main duct is continued within a cylinder head of the combustion engine. It is thereby possible to situate the end of the bypass duct particularly close to the valve opening, and it is also possible for an intake pipe according to the invention to be provided in the case of cylinder heads with particularly long inlet ducts. In an economical and simple detail design, the division is constructed at least in part as a dividing wall which projects beyond a connection plane on the cylinder-head side and into the cylinder head. Depending on requirements, a dividing member which is fixed in an inlet region of the cylinder head, e.g. in the form of a sheet metal part press-fitted in the inlet duct, can be provided in addition or as an alternative.

Further advantages and features of the invention will emerge from the illustrative embodiments described below and from the dependent claims.

BRIEF DESCRIPTION OF THE DRAWINGS

A number of preferred illustrative embodiments of the invention are described below and explained in greater detail with reference to the attached drawings, in which:

FIG. 8 shows a further illustrative embodiment of an intake pipe according to the invention with a bypass duct situated at the bottom;

FIG. 9 shows a further illustrative embodiment of an intake pipe according to the invention with a bypass duct situated at the top;

DETAILED DESCRIPTION

Figure 1:
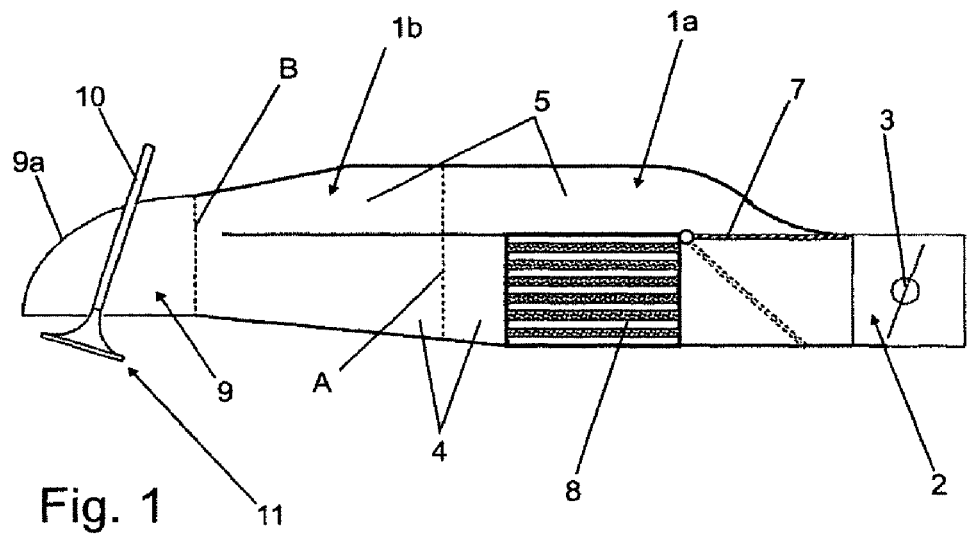
FIG. 1 shows a schematic sectional view of a first embodiment of an intake pipe according to the invention.

The intake pipe shown schematically in lateral cross section in FIG. 1 comprises a housing 1 having an inlet opening 2, in which a throttle valve 3 is arranged.

Branching off from a main duct 4, downstream of the inlet opening 2, there is a bypass duct 5, the main duct 4 and the bypass duct 5 being separated from one another by a dividing wall 6 arranged in the housing 1. A drivable control element 7, which guides the air flow through the main duct 4 in a first end position and guides the air flow through the bypass duct 5 in a second end position, is provided in the region of the branch.

Arranged in the main duct 4 is an indirect charge air cooler 8, through which the air fed in flows for the purpose of cooling in so far as it is guided through the main duct 4 in a manner dependent on the control element 7.

The air fed to the intake pipe is compressed by an exhaust turbocharger of the combustion engine (not shown). Depending on the configuration of the heat exchanger 8, an additional upstream charge air cooler can be provided, e.g. in the form of a direct charge air cooler around which external air flows.

In the illustrative embodiment under consideration, the control element 7 and the heat exchanger 8 are arranged in a plenum region 1b of the intake pipe, said plenum region branching downstream into separate individual inlet ducts 1b. In FIG. 1 of the drawing, the boundary between the plenum region 1a and the individual duct region 1b is indicated by a dashed line A. The inlet ducts 1b are flanged to a cylinder head 9 of the combustion engine in a manner known per se, a boundary between the individual ducts 1b and a respective inlet region of the cylinder head 9 being indicated by a dashed line B.

Inlet valves 10 are arranged in a known manner in the inlet region of the cylinder head 9. The dividing wall 6 for separating the bypass duct 5 and the main duct 4 extends a long way into the individual inlet ducts 1b, with the result that the bypass duct 5 ends only in the vicinity of an inlet opening 11 of the inlet valve 10. In relation to a plane of the valve opening 11, the bypass duct 5 is arranged above the main duct 4, with the result that the air flow passed through the bypass duct 5 flows along a curved wall 9a of the inlet region 9, and flows into the cylinder principally on a rear side of the inlet valve 10, at least when the main duct 4 is shut off. A swirl in a counterclockwise direction in FIG. 1 is thereby impressed upon the inflowing gas, resulting in the formation of a vortex in the combustion chamber of the cylinder. Such a vortex-type inflow of the gas is advantageous for improving combustion, especially at low engine speeds in part load operation. A bypass duct 5 constructed in this way has the characteristics of a tumble or swirl duct of the type already used on conventional intake pipes.

In an embodiment which is not shown in detail, the dividing wall 6 can also continue into the inlet region 9 of the cylinder head, i.e. downstream of the plane B dividing the intake pipe and the cylinder head. This can be implemented, for example, in the form of tongue-type extensions of the dividing wall 6 which project beyond a connection flange of the intake pipe and are introduced into the inlet regions 9 of the cylinder head when the intake pipe is fitted. As an alternative or complementary measure, a division, in the form of a pressed sheet-metal component for example, which is separate from the dividing wall 6 and adjoins the dividing wall in the fitted condition, can also be arranged in the inlet region 9. The division arranged in the cylinder head 9 can have a curved profile, at least in part, which is matched to the shape of the inlet region 9, 9a.

In the case of diesel engines especially but also in the case of spark-ignition engines, the fuel can be injected directly or at any point along the intake pipe, in accordance with known prior art alternatives. The location at which and manner in which fuel and air are added is not of the essence of the invention. In general terms, therefore, the phrase "charge air flow" in the sense in which it is used in the invention can also be taken to mean an air/fuel mixture which is already combustible.

Figure 2:
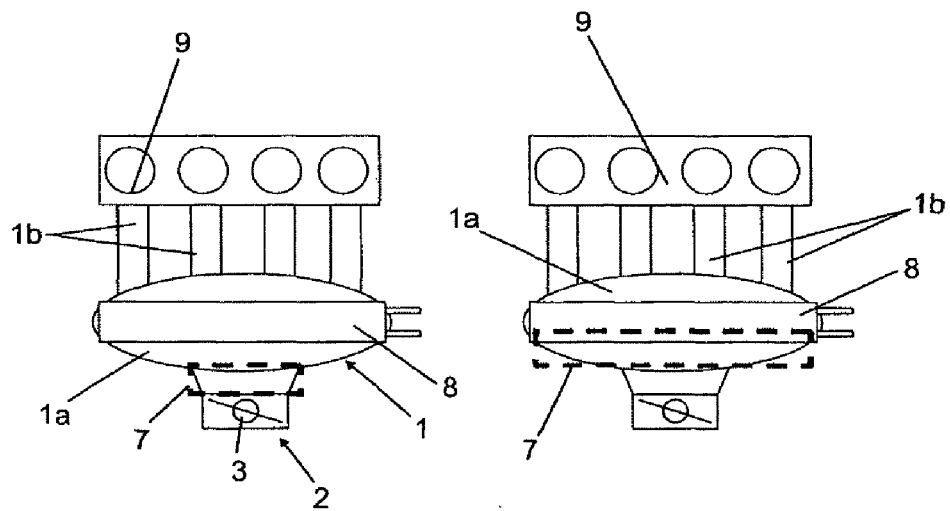
FIG. 2 shows a plan view of two alternative detail designs of the illustrative embodiment in FIG. 1.

The plan view according to FIG. 2 shows two alternative modifications of the arrangement of the control element 7. In the modification according to the left hand illustration, the control element 7 is arranged further into the feed region 2, allowing it to be made smaller. In the case of the right hand illustration, the control element extends substantially over the entire width of the heat exchanger 8 and is thus pivoted immediately ahead of the inlet area of the heat exchanger 8.

Figure 3:
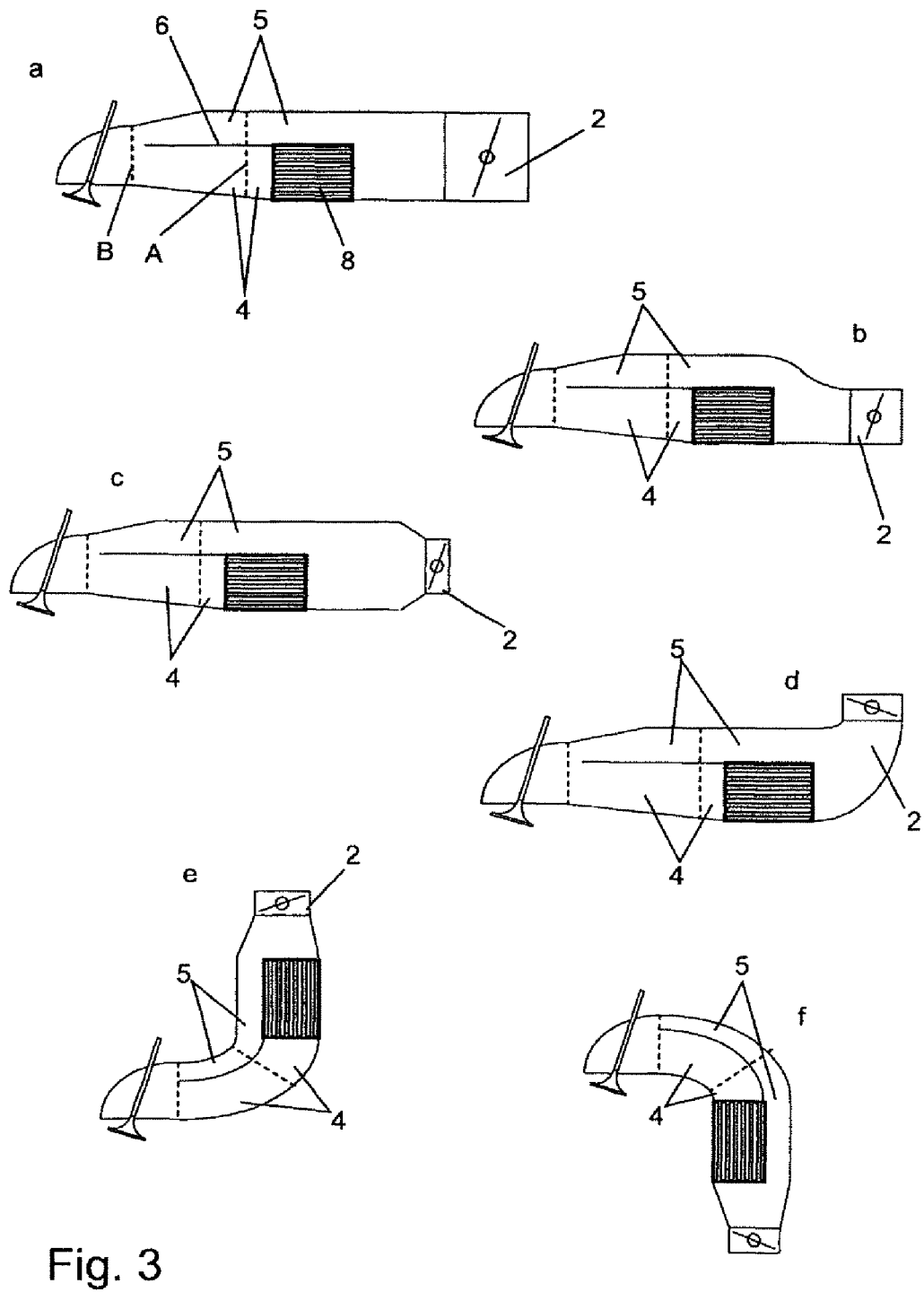
FIG. 3 shows a number of alternative geometries of an intake pipe according to the invention.

FIG. 3 shows six different modifications of the shape of the housing of an intake pipe according to the invention, a dividing wall 6 in each case extending into the immediate vicinity of an inlet opening 11 of an inlet valve 10, with the result that the bypass duct 5, which is in each case divided off, brings about a different approach flow in the region of the valve opening 11 than is the case for the main duct 4. In this arrangement, the shape of the ducts 4, 5 can be straight, as in examples a, b, c and d, or curved, as in examples e and f. As shown in example d, the charge air fed in can first of all undergo a deflection through 90° before it is divided up between the main duct 4 and the bypass duct 5. The feed region 2 can be of different diameters (see, for example, version a in comparison with versions b-f). In FIG. 3, an illustration of a control element for dividing the inflowing air between the main duct 4 and the bypass duct 5 has in each case been omitted, for reasons of clarity.

Figure 4:
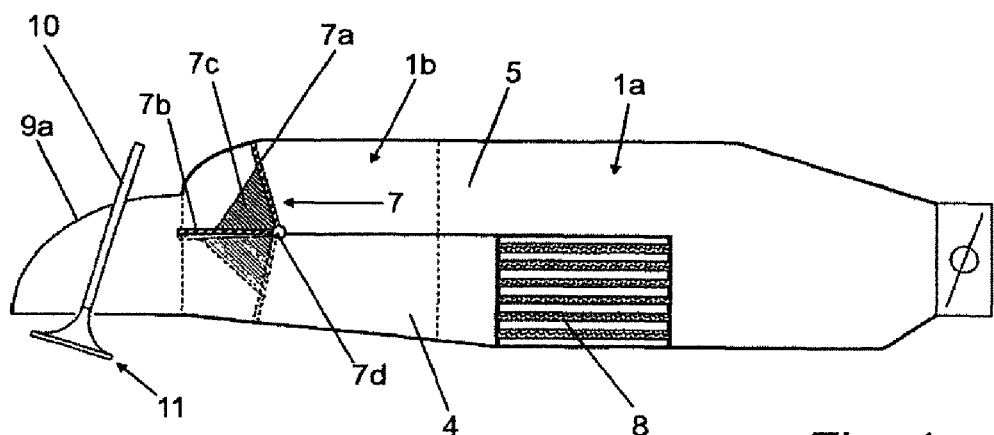
FIG. 4 shows a schematic lateral plan view of a second illustrative embodiment of an intake pipe according to the invention.
Figure 5:
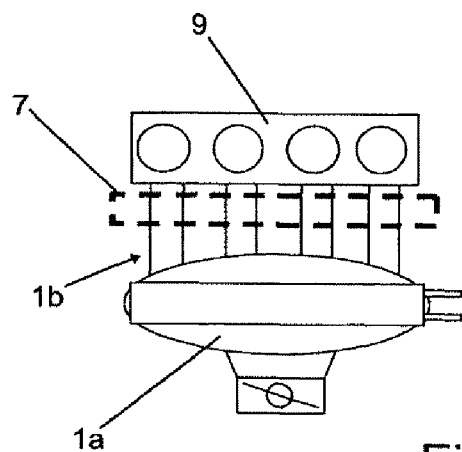
FIG. 5 shows a schematic plan view of the illustrative embodiment in FIG. 4 from above.

In the case of the embodiment shown in FIG. 4, the plan view of which is shown in FIG. 5, the control element 7 is not arranged upstream of the heat exchanger 8 but at the end of the main duct 4 and the bypass duct 5 in the direction of flow. In the present case, the control element 7 is a double flap with a first flap surface 7a and a second flap surface 7b, which are at an angle of about 65° to one another. Extending between the flap surfaces 7a, 7b are reinforcing ribs 7c, making the double flap 7 shown in FIG. 4 particularly rigid. A hinge shaft 7d of the double flap 7 is arranged in the region of the end of the dividing wall 6.

In accordance with the arrangement of the double flap 7 at the end of the ducts 4, 5, the double flap 7 is situated in the region of the separation into individual inlet ducts 1b, immediately ahead of the connection to the cylinder head 9. This means that a dedicated double flap 7 in the respective inlet duct 1b is required for each of the cylinders, of which there are four in the schematic example under consideration. The hinge shaft 7d can be a single shaft passing through all the parallel inlet ducts 1b or, alternatively, separate shafts in each case. Overall, the outlay on construction in terms of the number of components is greater, but the required actuating force is less in comparison with a large central control flap owing to the small cross section of each of the separate inlet ducts 1b.

As in the case of a number of other illustrative embodiments, FIG. 4 shows the control element 7 both in a first, full load position and in a second, part load position, the full load position in each case being indicated as solid lines and the part load position being indicated as dashed lines.

Figure 6:
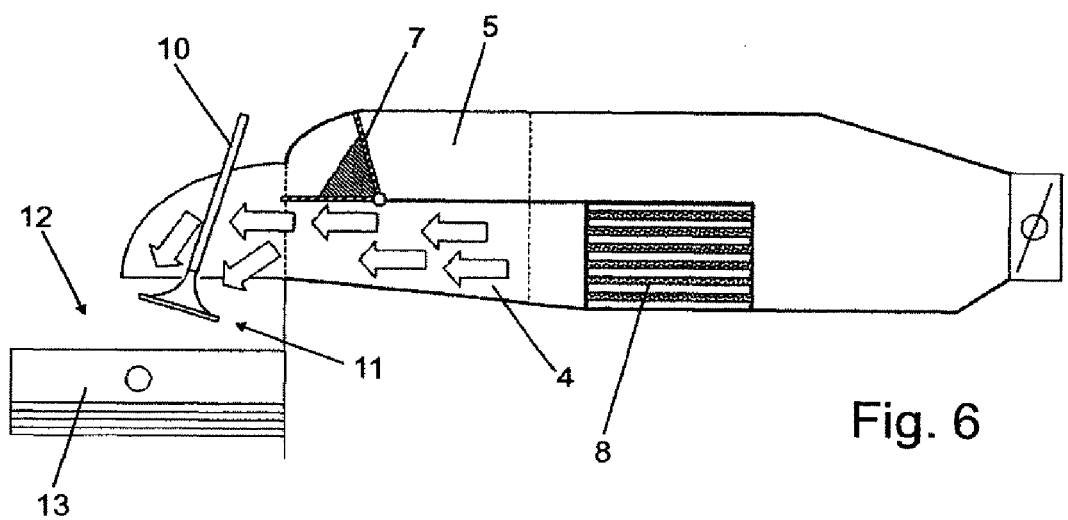
FIG. 6 shows the illustrative embodiment in FIG. 4 with a schematic representation of the air flow through the main duct.
Figure 7:
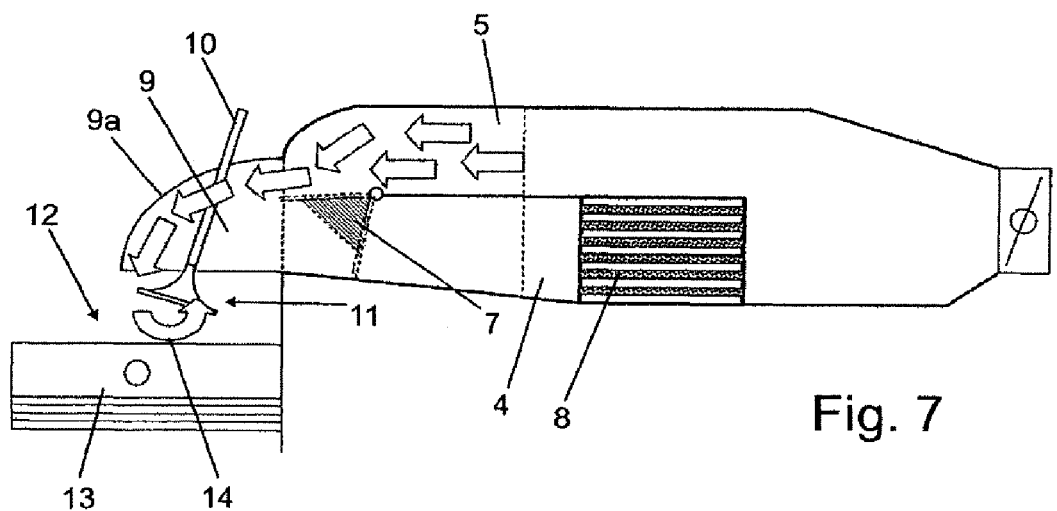
FIG. 7 shows the illustrative embodiment in FIG. 4 with a schematic representation of the air flow through the bypass duct.

FIG. 6 and FIG. 7 show schematically the course of the charge air flow in the two end positions of the control element 7, using the illustrative embodiment shown in FIG. 4 described above. In the case of full load according to FIG. 6, all the charge air flows through the indirect charge air cooler 8 and the main duct 4 owing to the fact that the bypass duct 5 is closed by the control element 7. In accordance with the end arrangement of the main duct 4, the air flow is distributed relatively uniformly around the inlet valve 10 in the inlet region 9 and flows into the combustion chamber 12 in a manner homogeneously distributed across the valve opening 11. To make matters clearer, a piston 3 of a combustion engine is shown schematically.

In the case of part load according to FIG. 7 with the control element 7 in the correspondingly reversed end position, the air flows exclusively through the bypass duct 5. In this case, the end of the control flap 7 is already situated in the region of a deflection of the air flow and acts like a separation edge. Moreover, the bent wall 9a of the inlet region 9 guides the air flow indicated by arrows over a curved path, with the result that the majority of the air flowing through the bypass 5 enters the combustion chamber 12 in an outer end region of the inlet opening 11, i.e. on only one side of the valve 10. A tumbling or swirling flow is thereby created in the combustion chamber, this being indicated by a curved arrow 14. This flow ensures particularly good turbulence in the gas that has flowed in, this turbulence being advantageous for improving combustion for the case of part load at a low charge pressure.

In part load operation, cooling of the charge air flow is required to only a limited extent, or not at all, since in the absence of compression there is also no significant heating of the air. On the contrary, a certain minimum air temperature is desired for this case in order to ensure good vaporization and distribution of the fuel. Accordingly, excessive cooling of the air at low engine speeds would not be desired, thus making it advantageous to bypass the charge air cooler by means of the bypass.

The illustrative embodiment shown in FIG. 8 shows a modification of an intake pipe according to the invention, in which the bypass duct 5 runs below the main duct 4 in relation to a plane of the inlet opening 11. In the example shown in FIG. 8, too, the control element 7 is arranged at the same end of the dividing wall 6 as the inlet valve. In the example shown in FIG. 8, the approach flow to the inlet valve 10 can take place in an optimum manner, especially in full load operation, owing to a straight flow profile, as can be seen from the geometry of the ducts.

As an alternative, however, it is also possible for the bypass duct 5 to be arranged above the main duct 4 in accordance with the example shown in FIG. 9.

In the embodiment shown in FIG. 10, the bypass duct 5 is arranged below the main duct 4 and has a masking feature 14. The masking feature 14 is a specially formed separation edge for the air flow through the bypass duct 5, with the result that the air (not shown) flows principally on the outer side of the inlet valve 10, in a manner similar to that shown in FIG. 7.

Figure 10:
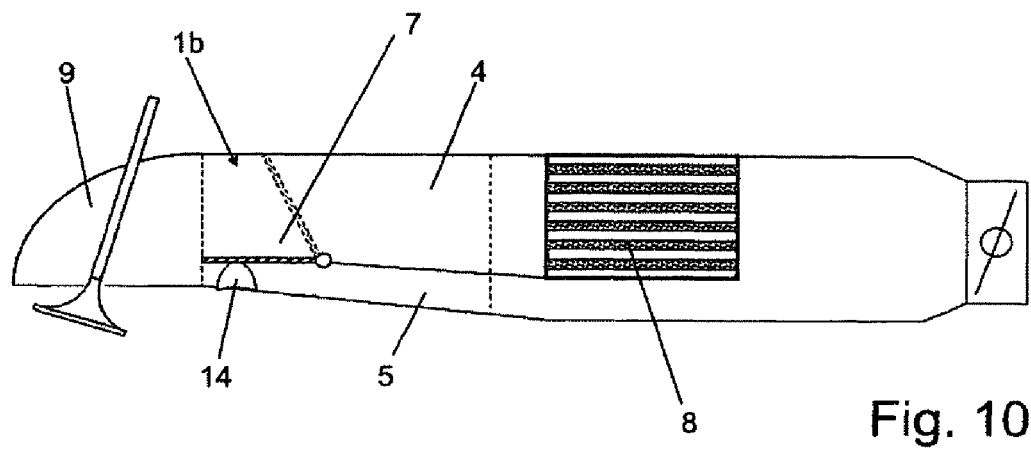
FIG. 10 shows a further illustrative embodiment of an intake pipe according to the invention with a masked bypass duct.
Figure 11:
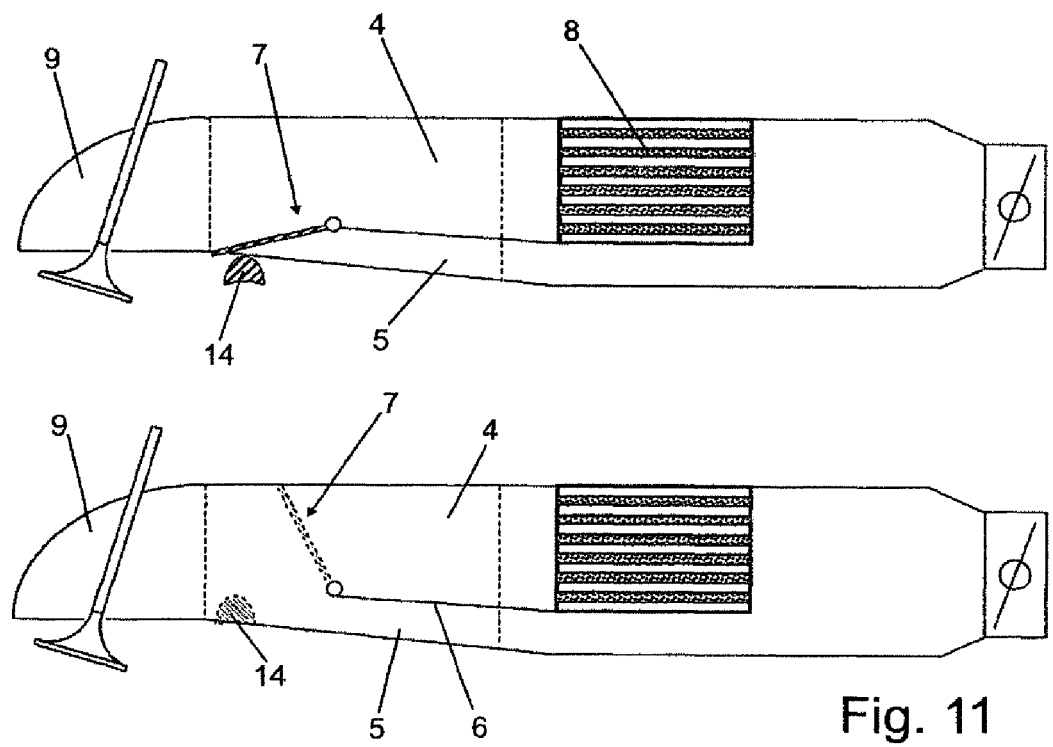
FIG. 11 shows a further illustrative embodiment of an intake pipe according to the invention with controllable masking of the bypass duct.

FIG. 11 shows a modification of the illustration in FIG. 10, in which the masking feature designed as a separation edge 14 is additionally of adjustable design. In the upper part of the figure, the main duct 4, which is situated at the top, is activated, the masking feature 14 being lowered, thus allowing the control element 7 to adopt an even wider opening angle than in the case of the embodiment shown in FIG. 10. This allows a particularly favorable air flow profile for full load operation.

If the control element 7 is switched over in part load operation, the separation edge 14 is in a different position, in which it projects into the bypass duct 5. An adjustable separation edge 14 of this kind can be provided in a simple manner by means that have a spring action or selectively by means of actuators, for example.

Figure 12:
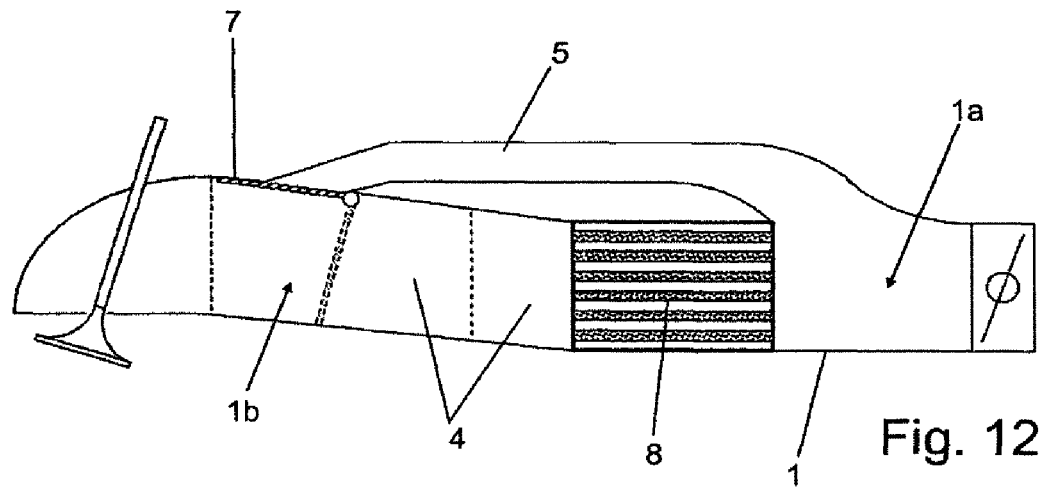
FIG. 12 shows a further illustrative embodiment of the invention with a separately routed bypass duct.
Figure 13:
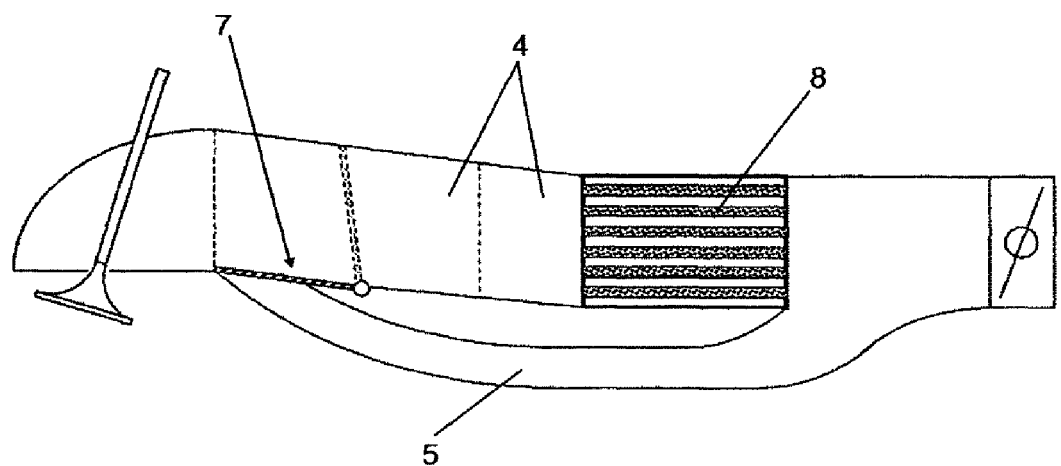
FIG. 13 shows a further intake pipe according to the invention with a separately routed bypass situated at the bottom.

The examples shown in FIG. 12 and FIG. 13 each show versions of an intake pipe according to the invention in which the bypass duct 5 runs independently of the main duct 4. Here, the bypass duct 5 is formed in the manner of a separate pipe conduit. The pipe conduit can comprise a pipe component which is actually separate from the housing 1 or, as illustrated, can also be an appropriate part formed from the housing 1. Fundamentally, this allows optimization of the length and shape of the bypass duct 5, by means of which, in particular, an oscillation tube effect for resonance-type pressure charging in part load operation can be optimized.

In the version shown in FIG. 12, the bypass duct 5 is arranged above the main duct 4 while, in the version shown in FIG. 13, it is below said duct.

Figure 14:
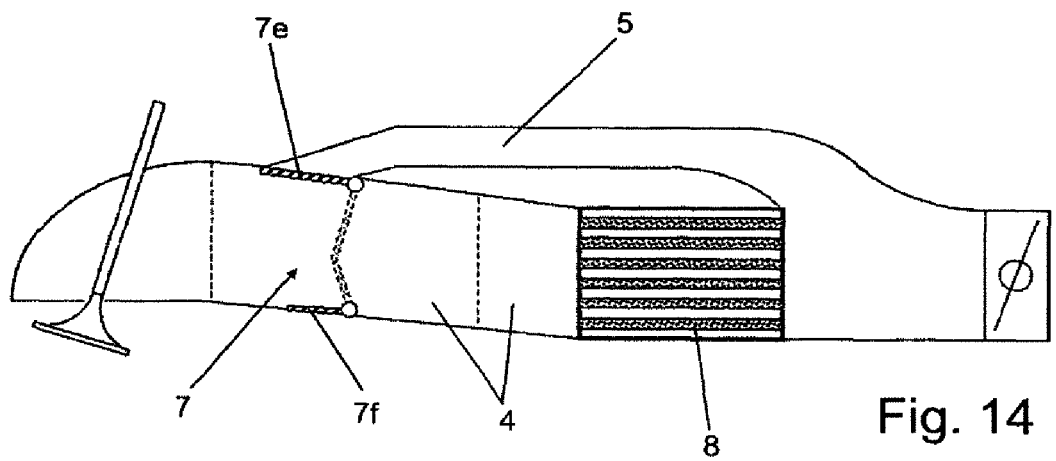
FIG. 14 shows a further illustrative embodiment of the invention with a two-part control element.
Figure 15:
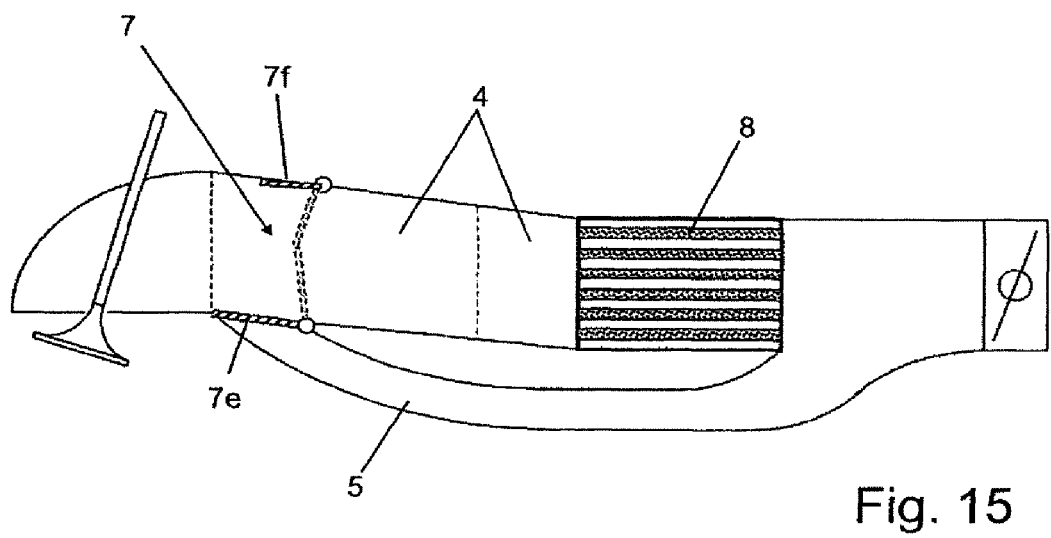
FIG. 15 shows a modification of the illustrative embodiment in FIG. 14.

FIG. 14 and FIG. 15 each show modifications of the illustrative embodiments shown in FIG. 12 and FIG. 13 respectively. In each case, the modification consists in that it is not an individual control flap 7 (see FIG. 12 and FIG. 13) which is provided but a two-part control element having a first component flap 7e and a second component flap 7f. In the full load position, the first component flap 7e can close the bypass duct 5 completely. In the part load position, the second component flap 7f serves to close the main duct 4 completely, the first component flap 7e projecting only part way into the main duct 4 and being complemented for complete closure by the component flap 7f pivoted to the opposite wall. In this embodiment, in particular, suitable shaping of one of the component flaps can furthermore effect masking of the bypass duct 5 for the purpose of swirl generation. The component flaps 7e, 7f can have separate actuators or, alternatively, each have a common actuator, it being possible for the component flaps 7e, 7f to be connected to one another mechanically by a positive control means such as a linkage. Furthermore, dividing the control element 7 into component flaps 7e, 7f has advantages as regards the required driving forces.

Figure 16:
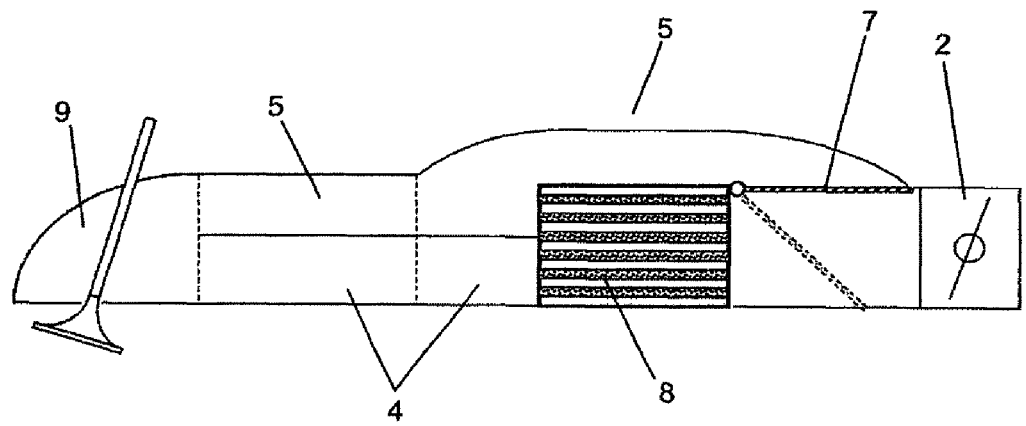
FIGS. 16-18 each show illustrative embodiments of an intake pipe according to the invention with a control element arrangement upstream of the heat exchanger.

In the illustrative embodiment shown in FIG. 16, an arrangement of the control element 7 similar to the illustrative embodiment shown in FIG. 1 is provided, although the dividing wall 6 does not separate the entire heat exchanger 8 from the bypass duct 5 but only part of its inlet area. In this arrangement, the control element 7 is arranged in such a way that the bypass duct 5 is completely closed at the inlet end in the full load position. At the outlet end or downstream of the heat exchanger 8, some of the compressed air flows through the bypass duct 5 and some through the main duct 4, however, thereby ensuring that optimum use is made of the available space in the operating state of a large air flow rate. In the part load position, access to the heat exchanger 8 is closed off completely, with the result that all the charge air flows through the bypass duct 5.

Figure 17:
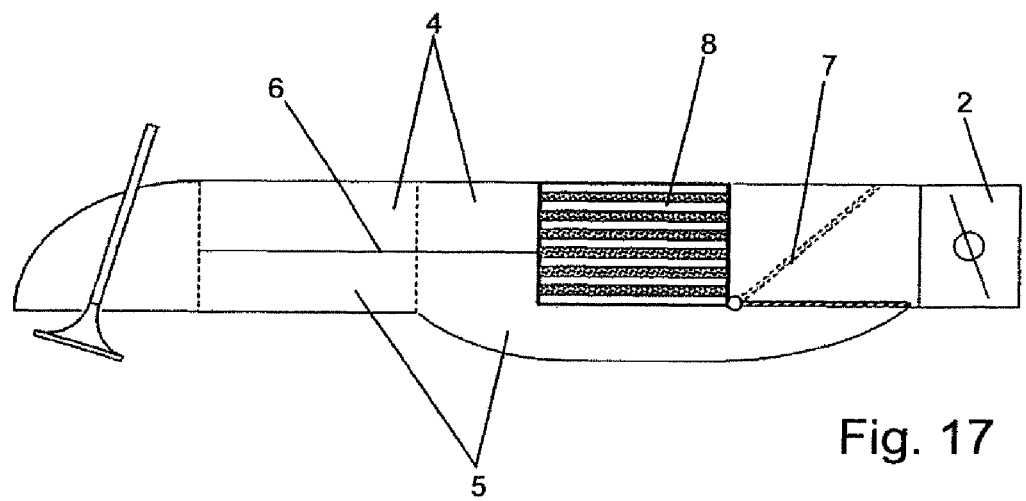

The variant shown in FIG. 17 is an arrangement similar to that in FIG. 16, the difference being that the bypass duct 5 is provided below the main duct 4.

Figure 18:
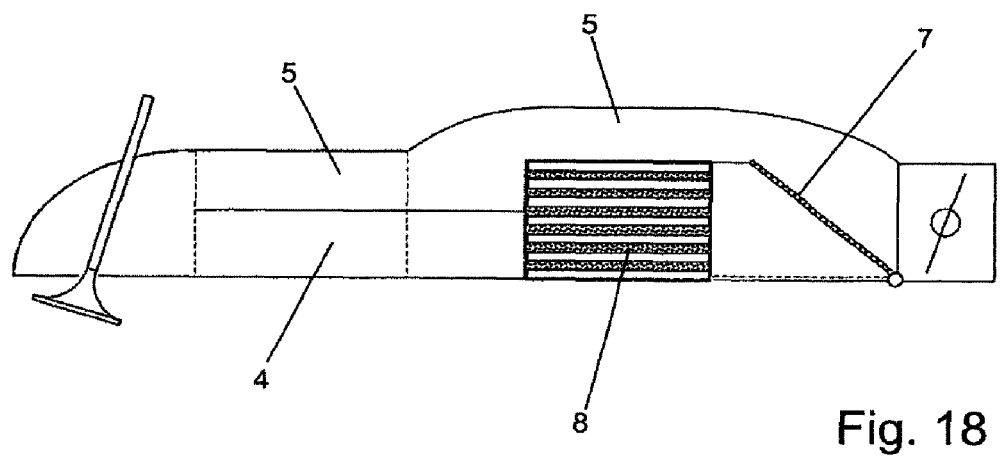

FIG. 18 shows an illustrative embodiment which is similar to that in FIG. 16. However, the difference is that the control element 7 is not pivoted in the region of the heat exchanger 8 but at a distance from the heat exchanger 8 on the housing wall. In this arrangement, a rising charge pressure assists the opening motion of the control element 7, whereas, in the illustrative embodiment shown in FIG. 16, an increased opening force is required as the charge pressure rises.

Figure 19:
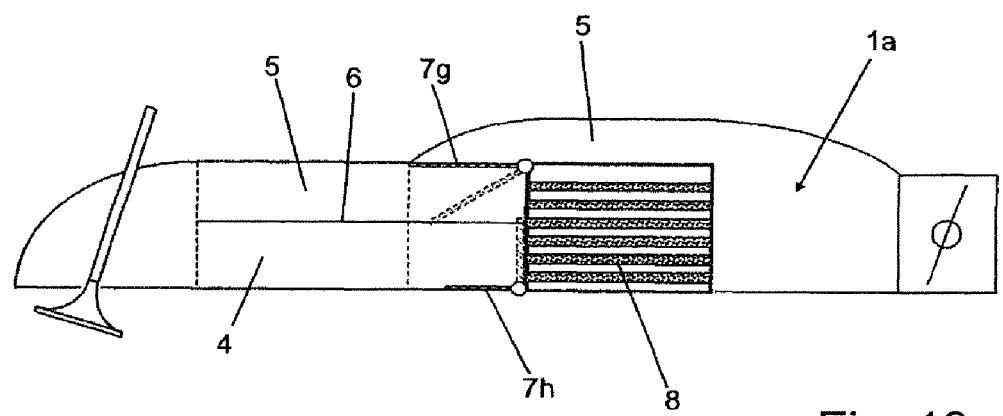
FIG. 19 shows a further illustrative embodiment with two control elements.

In the illustrative embodiment shown in FIG. 19, the dividing wall 6 divides the heat exchanger 8 into different component flows at the outlet end, as in the illustrative embodiments shown in FIG. 16 to FIG. 18, and that part of the bypass duct 5 which is arranged downstream of the heat exchanger can also carry a flow of cooled air or be used jointly in a full load position. The main difference with respect to the preceding illustrative embodiments is the arrangement of a first control element 7g and of a further control element 7h directly downstream of the heat exchanger 8. The first control element 7g is arranged in the bypass duct 5, and the second control element 7h is arranged in the main duct 4. At part load, the main duct 4 as a whole can be completely closed and the bypass duct 5 opened (with both control elements or control flaps 7g, 7h in the position indicated by dashed lines). At full load, the first control element 7g closes a bypass duct section which is parallel to the heat exchanger and simultaneously exposes part of the outlet area of the heat exchanger 8, said area opening into that part of the bypass duct 5 which lies downstream of the control flap. In the full load position, there is thus a flow through both the main duct 4 and the bypass duct 5 downstream of the heat exchanger 8.

In the case of a possible modification of the embodiment shown in FIG. 19, it would also be possible to dispense with one control flap 7h, the result being that part of the air flow flows through the heat exchanger 8 and the main duct 4 in part load operation. Owing to the larger pressure drop across the heat exchanger 8, however, by far the greater proportion of the air flow will flow through the bypass duct 5.

In a further possible modification of an embodiment with two control elements (not shown), a first control element could close the bypass duct in an adjustable manner, and a second control element could close the main duct in an adjustable manner, thus enabling both adjustment of the flow paths and adjustment of the overall flow for the individual operating modes. As a result, it would then be possible to dispense with a throttle valve 3, where appropriate.

Figure 20:
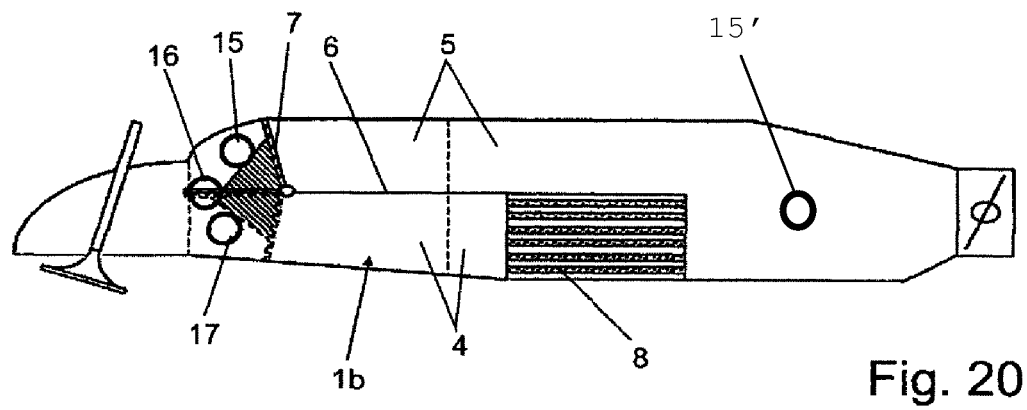
FIG. 20 shows a further illustrative embodiment with a feed for recirculated exhaust gas.

The illustrative embodiment shown in FIG. 20 corresponds to a large extent to that shown in FIG. 4, except that feeds 15, 16, 17 for recirculated exhaust gas are additionally provided in the region of the separate inlet ducts 1b and of the double flap 7. In this arrangement, feed 15 leads exclusively into the bypass duct 5, feed 17 leads exclusively into the main duct 4, and feed 16 leads simultaneously into both ducts 4, 5. Depending on requirements, a feed for recirculated exhaust gas can have one or more feeds 15, 16 and 17.

Figure 21:
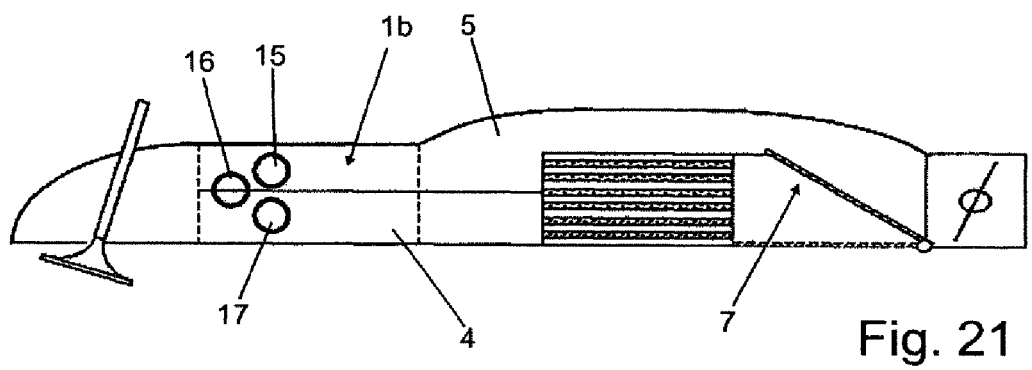
FIG. 21 shows a further embodiment with a feed for recirculated exhaust gas.

The illustrative embodiment shown in FIG. 21 corresponds to that shown in FIG. 20, except that the control element 7 is designed as in the illustrative embodiment shown in FIG. 18 and is arranged upstream of the heat exchanger 8.

In a modification, the recirculated exhaust gas can be fed in upstream of the heat exchanger 8, (through feed 15', FIG. 20) with the result that the recirculated exhaust gas is also cooled by the heat exchanger 8.

Figure 22:
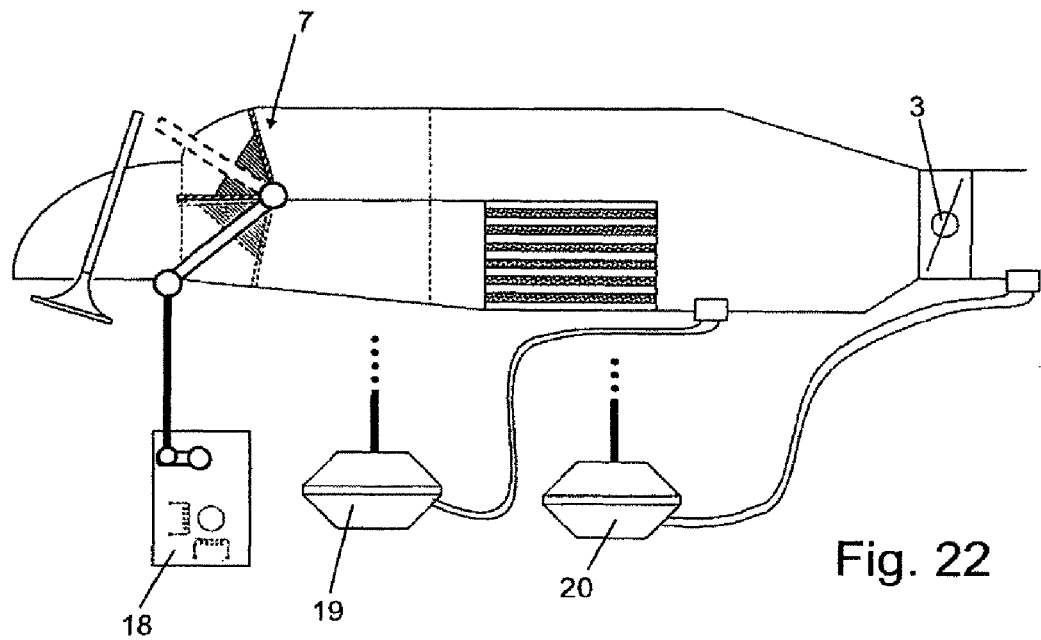
FIG. 22 shows a schematic representation of an intake pipe according to the invention with a number of alternative actuators.

The illustrative embodiment shown in FIG. 22 corresponds to that shown in FIG. 4, with alternative actuators for power-assisted adjustment of the control element 7 being shown schematically. The actuator concerned can be an electromechanical actuator 18, in particular one driven by control electronics, or, as an alternative or complementary measure, actuators 19, 20 designed as pressure cells. In this arrangement, the pressure cell 19 is subjected to pressure downstream of the throttle valve 3, and this can be referred to as "vacuum actuation". Pressure cell 20, which is an alternative thereto, is connected upstream of the throttle valve 3, and this can be referred to as "charge pressure actuation".

The various specific features of the illustrative embodiments can be combined in an appropriate manner depending on requirements.

The invention claimed is:

1. An intake pipe for a combustion engine, comprising
a housing (1) having a feed (2) for compressed air,
a heat exchanger (8), which is arranged within a main duct (4) in the housing (1) and through which the air can flow for heat exchange with a fluid, and
a bypass duct (5), which is separated from the main duct (4) at least sectionwise and has at least one control element (7) to enable the air fed in to bypass the heat exchanger (8) in an adjustable manner,
wherein
an engine-side end of the bypass duct (5) is at a short distance from an opening (11) of an inlet valve (10) of the combustion engine, which distance is still relevant to the flow wherein the distance is no more than about seven times a diameter of the inlet valve (10), wherein a flow cross section of the bypass duct (5) is no less than about 10% of a flow cross section of the main duct (4), and wherein the flow cross section of the bypass duct (5) is no more than about 60% of a flow cross section of the main duct (4), and further wherein the control element (7) is formed as a double flap (7a, 7b) wherein a first flap (7a) of the double flap is positioned at an angle from a second flap of the double flap of less than 90°, and wherein the double flap is movable between a part load position wherein the first flap closes the main duct and the second flap opens the bypass duct, and a full load position wherein the first flap opens the main duct and the second flap closes the bypass duct.

2. The intake pipe as claimed in claim 1, wherein the bypass duct (5) is designed as a tumble or swirl duct of the intake pipe.

3. The intake pipe as claimed in claim 1, wherein the bypass duct (5) ends immediately ahead of a curved wall surface (9a) of an inlet region (9) of the combustion engine.

4. The intake pipe as claimed in claim 1, wherein the bypass duct (5) is arranged above the main duct (4) in relation to an opening plane of the inlet valve (10).

5. The intake pipe as claimed in claim 1, wherein the bypass duct (5) is arranged below the main duct (4) in relation to an opening plane of the inlet valve (10).

6. The intake pipe as claimed in claim 1, wherein a masking structure (14) is provided in the end region of the bypass duct (5).

7. The intake pipe as claimed in claim 1, wherein the main duct (4) is separated from the bypass duct (5) by means of a dividing wall (6) arranged in the housing.

8. The intake pipe as claimed in claim 1, wherein, at least sectionwise, the bypass duct (5) is designed as a separate pipe conduit from the main duct (4).

9. The intake pipe as claimed in claim 1, wherein the bypass duct (5) is designed, as regards its length, as an oscillation tube for the generation of resonance-type pressure charging, in an engine speed range between about 1000 and about 3000 revolutions per minute.

10. The intake pipe as claimed in claim 1, wherein the housing (1) is constructed substantially from a plastic.

11. The intake pipe as claimed in claim 1, wherein the control element (7) is arranged after the heat exchanger (8) in the direction of flow of the air.

12. The intake pipe as claimed in claim 11, wherein the control element (7) is arranged in a region (1b) of the intake pipe which is separated in relation to different cylinders.

13. The intake pipe as claimed in claim 1, wherein the control element (7) is adjustable in multiple stages or in an infinitely variable manner for the variably adjustable distribution of the air flow between the main duct (4) and the bypass duct (5).

14. The intake pipe as claimed in claim 1, wherein, in one operating mode, the air flows through both the main duct (4) and at least a part of the bypass duct (5) which is arranged downstream of the heat exchanger (8).

15. The intake pipe as claimed in claim 1, wherein a throttle valve (3) is arranged in the intake pipe.

16. The intake pipe as claimed in claim 1, wherein the heat exchanger (8) is connected to a low-temperature cooling circuit.

17. The intake pipe as claimed in claim 1, wherein the heat exchanger (8) is designed as an evaporator of a refrigeration circuit.

18. The intake pipe as claimed in claim 1, wherein a flow of the fluid through the heat exchanger (8) can be controlled in an adjustable manner.

19. The intake pipe as claimed in claim 1, wherein the control element (7) is connected to an actuator (18, 19, 20).

20. The intake pipe as claimed in claim 19, wherein the actuator comprises a pressure cell (19, 20).

21. The intake pipe as claimed in claim 19, wherein the actuator has an electric drive (18).

22. The intake pipe as claimed in claim 1, wherein at least one sensor for monitoring the position of the control element (7) is provided.

23. The intake pipe as claimed in claim 1, wherein a feed (15, 16, 17) for recirculated exhaust gas is arranged on the intake pipe.

24. The intake pipe as claimed in claim 23, wherein the feed (15, 17) takes place separately into the bypass duct and/or the main duct.

25. The intake pipe as claimed in claim 23, wherein the feed (16) takes place simultaneously into the bypass duct and the main duct.

26. The intake pipe as claimed in claim 23, wherein the feed (15, 16, 17) takes place downstream of the heat exchanger.

27. The intake pipe as claimed in claim 23, wherein the feed takes place upstream of the heat exchanger.

28. The intake pipe as claimed in claim 1, wherein a division between the bypass duct (5) and the main duct (4) is continued within a cylinder head of the combustion engine.

29. The intake pipe as claimed in claim 28, wherein the division is constructed at least in part as a dividing wall which projects beyond a connection plane (B) on the cylinder-head side and into the cylinder head.

30. The intake pipe as claimed in claim 28, wherein the division is constructed as a dividing member which is fixed in an inlet region (9) of the cylinder head.

31. The intake pipe as claimed in claim 1, wherein the distance is no more than about four times a diameter of the inlet valve (10).

32. The intake pipe as claimed in claim 10, wherein the housing (1) is constructed substantially from a glass-reinforced polyamide.

33. The intake pipe as claimed in claim 1, wherein the double flap is provided with reinforcing ribs (7c).

34. The intake pipe as claimed in claim 1, wherein the first flap and the second flap are connected by reinforcing ribs (7c).

35. The intake pipe as claimed in claim 1, wherein the double flap is pivotable around a pivot point (7d) positioned at an inlet end side of the dividing wall (6).

* * * * *